(12) United States Patent
Madhavarapu et al.

(10) Patent No.: US 9,336,218 B2
(45) Date of Patent: *May 10, 2016

(54) MANAGING A BINARY OBJECT IN A DATABASE SYSTEM

(71) Applicant: Microsoft Technology Licensing, LLC, Redmond, WA (US)

(72) Inventors: Pradeep Madhavarapu, Kirkland, WA (US); Michael Warmington, Redmond, WA (US); Alexandru Chirica, Redmond, WA (US); Jun Fang, Sammamish, WA (US); Rohan Kumar, Redmond, WA (US); Maciej Plaza, Bellevue, WA (US); Srini Acharya, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/487,066

(22) Filed: Sep. 15, 2014

(65) Prior Publication Data

US 2015/0006493 A1 Jan. 1, 2015

Related U.S. Application Data

(60) Continuation of application No. 13/565,608, filed on Aug. 2, 2012, now Pat. No. 8,838,568, which is a division of application No. 12/784,508, filed on May 21, 2010, now Pat. No. 8,332,432.

(51) Int. Cl.
*G06F 17/30* (2006.01)

(52) U.S. Cl.
CPC .... *G06F 17/30082* (2013.01); *G06F 17/30286* (2013.01); *G06F 17/30318* (2013.01)

(58) Field of Classification Search
CPC ........................................................ G06F 17/30
USPC ................................................. 707/600–899
See application file for complete search history.

(56) References Cited

U.S. PATENT DOCUMENTS

| 6,356,946 B1 | 3/2002 | Clegg et al. |
|---|---|---|
| 7,421,443 B2 | 9/2008 | Rajan et al. |

(Continued)

OTHER PUBLICATIONS

Sears, et al., "To Blob or Not to Blob: Large Object Storage in a Database or a Filesystem?", A Technical Report, MSR-TR-2006-45, Apr. 2006, 11 Pages.

(Continued)

*Primary Examiner* — Isaac M Woo
(74) *Attorney, Agent, or Firm* — Aneesh Mehta; Kate Drakos; Micky Minhas

(57) ABSTRACT

A method for managing a binary object in a database system is provided. The method may include receiving a request to store the binary object and determining if a size of the binary object is above a first threshold. If the size is less than the first threshold, the method may include storing the binary object in a database of the database system using a database communication protocol. If the size is above the first threshold, the method may include determining if the size is above a second threshold. To this end, if the size is less than the second threshold, the method may include storing the binary object in a file system of the database system using the database communication protocol. Furthermore, if the size is above the second threshold, the method may include storing the binary object in the file system using a file system communication protocol.

30 Claims, 4 Drawing Sheets

(56) References Cited

U.S. PATENT DOCUMENTS

| | | |
|---|---|---|
| 7,552,130 B2 | 6/2009 | Cook et al. |
| 8,401,996 B2 | 3/2013 | Muller et al. |
| 2008/0021865 A1* | 1/2008 | Corkill et al. .................... 707/2 |
| 2011/0289126 A1 | 11/2011 | Aikas et al. |

OTHER PUBLICATIONS

"Overview of Remote BLOB Storage (SharePoint Foundation 2010)", Available at: <<http://technetmicrosoft.com/en-us/library/ee748607(office.14).aspx>>, Published on: Jan. 7, 2010, 1 Page.

Martinez, Yoel, "Using CLR Integration to Compress Blobs/Clobs in SQL Server 2005", Available at: <<http://www.codeproject.com/Kb/database/blob_compress.aspx>>, Published on: Dec. 29, 2006, 5 Pages.

Barley, Ray, "Using FILESTREAM to Store BLOBs in the NTFS File System in SQL Server 2008", Available at: <<http://www.mssqltips.com/tip.asp?tip=1489>>, Published on: May 1, 2008, 6 Pages.

Schlichting, Don, "Storing Images and BLOB files in SQL Server", Available at: <<http://www.databasejournal.com/features/mssql/article.php/3719221/Storing-Images-and-BLOB-files-in-SQL-Server.htm>>, Published on: Jan. 4, 2008, 6 Pages.

"Child of the Machine: Image storage: Database Blob Vs. File system", Available at: <<http://www.childofthemachine.com/blog/2008/02/image-storage-database-blob-vs-file-system/>>, Published on: Feb. 8, 2008, 3 Pages.

"Notice of Allowance Issued in U.S. Appl. No. 13/565,608", Mailed Date: Apr. 7, 2014, Filed Date: Aug. 2, 2012, 9 Pages.

"Notice of Allowance Issued in U.S. Appl. No. 13/565,608", Mailed Date: Aug. 12, 2014, Filed Date: Aug. 2, 2012, 6 Pages.

* cited by examiner

MANAGING A BINARY OBJECT IN A DATABASE SYSTEM

CROSS-REFERENCE TO RELATED APPLICATION(S)

This application is a continuation of U.S. patent application Ser. No. 13/565,608, filed Aug. 2, 2012, which is a division of U.S. patent application Ser. No. 12/784,508, filed May 21, 2010, both of which are incorporated herein by reference in their entireties.

BACKGROUND

In database management systems, a binary large object, also referred to as a blob, is a collection of binary data stored as a single entity. Typically, blobs may be images, audio, or other multimedia objects though occasionally they may be executable code as well. When discussing the performance of a database management system, reading, writing, storing, and transferring blobs can present a significant issue.

Currently, blobs may be conventionally stored inside a database file (e.g., the varbinary datatype of SQL Server) or inside a traditional file system. Storing and retrieving relatively large blobs inside the database may be inefficient because of extra overhead that is required to do so. Particularly, the overhead required to store blobs in the database may increase as the size of the blob increases. In SQL, the Filestream feature was created in order to avoid this extra overhead by allowing the storing of blobs in the file system, e.g. disk storage. To this end, file system blob storage may be associated with a constant overhead independent of blob size. However, while storing blobs in the file system may stabilize overhead, this overhead may nevertheless be prohibitive when storing smaller size blobs. As a result, neither technique of storing blobs may by itself present an optimal method of managing blobs in a database system.

SUMMARY

Described herein are implementations of various technologies for managing binary objects in a database system. While various protocols may exist to facilitate management of binary objects in database system, their performance may vary widely depending on the size of the binary object. As such, various technologies described herein may generally seek to determine and select a relatively efficient protocol to manage a binary object according to the size of the binary object.

At a high level, several aspects of managing binary objects in a database system are encompassed within the various technologies described herein. A first aspect may focus on a method for storing a binary object in various locations using various protocols depending on the binary object size. To this end, an application may receive a request from a user or other entity to store a binary object. The application may pass such a request to a provider that performs the actual management of binary object data. As such, the provider may interface with both a database and a file system in communication with the database system. Thus, the application may be free from having to know any particular implementations regarding any backend devices with which the provider may interface.

Under this method, when storing a binary object, the provider may first determine the size of the binary object. If the binary object size is below a first threshold, the provider may store the binary object in the database using a database communication protocol. If the binary object size is above the first threshold but below a second, higher threshold, the provider may store the binary object in the file system using the database communication protocol. If the binary object size is above the second threshold, the provider may store the binary object in the file system using a file system communication protocol. By storing relatively small sized binary objects in the database and storing relatively medium and large sized binary objects in the file system, the method may facilitate relatively efficient storing of binary objects.

Another aspect may be related to the first aspect and may involve determining the size of the binary object if its size is not already known. To this end, when a request to store a binary object is received, the provider may initially begin buffering the data associated with the binary object in memory. The memory may be located on the same device as the application. If the size of the data buffered has reached the second threshold before the buffering is complete, the provider may discontinue buffering and create a new binary object in the file system. The provider may then write the data in the buffer to the newly created binary object as well as write any additional data associated with the binary object directly to the new binary object.

If the data has been completely buffered before its size has reached the second threshold, the provider can then determine the size of the binary object by determining the amount of data buffered. The provider may then store the binary object in the various locations using the various communication protocols according to the method described in the first aspect.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In general, one or more implementations described herein are directed to managing a binary object in a database system. Various techniques for managing a binary object in a database system will be described in more detail with reference to FIGS. 1-4.

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 1:
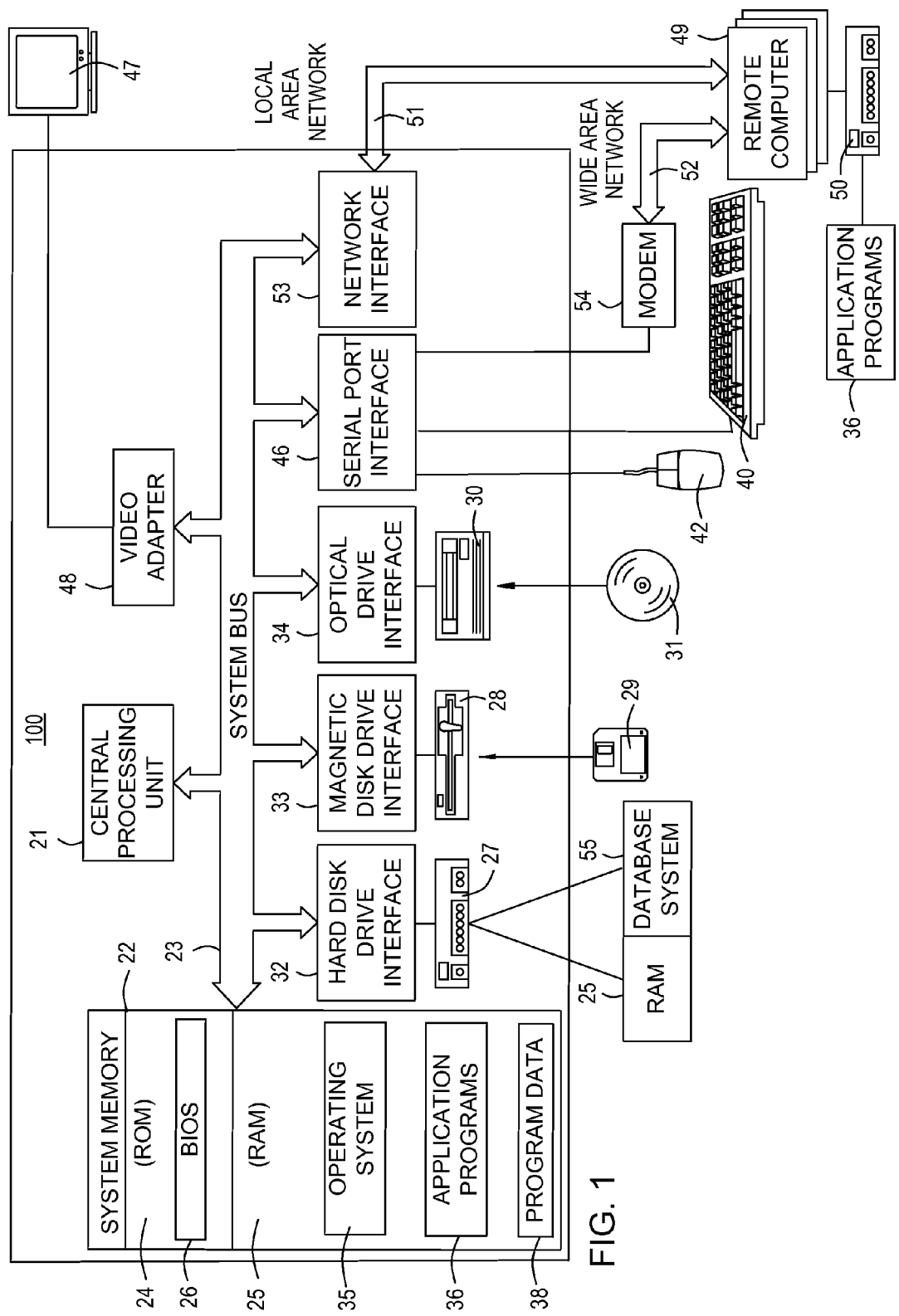
FIG. 1 illustrates a schematic diagram of a computing system in which the various techniques described herein may be incorporated and practiced.

FIG. 1 illustrates a schematic diagram of a computing system 100 in which the various technologies described herein may be incorporated and practiced. Although the computing system 100 may be a conventional desktop or a server computer, as described above, other computer system configurations may be used.

The computing system 100 may include a central processing unit (CPU) 21, a system memory 22 and a system bus 23 that couples various system components including the system memory 22 to the CPU 21. Although only one CPU is illustrated in FIG. 1, it should be understood that in some implementations the computing system 100 may include more than one CPU. The system bus 23 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 22 may include a read only memory (ROM) 24 and a random access memory (RAM) 25. A basic input/output system (BIOS) 26, containing the basic routines that help transfer information between elements within the computing system 100, such as during start-up, may be stored in the ROM 24.

The computing system 100 may further include a hard disk drive 27 for reading from and writing to a hard disk, a magnetic disk drive 28 for reading from and writing to a removable magnetic disk 29, and an optical disk drive 30 for reading from and writing to a removable optical disk 31, such as a CD ROM or other optical media. The hard disk drive 27, the magnetic disk drive 28, and the optical disk drive 30 may be connected to the system bus 23 by a hard disk drive interface 32, a magnetic disk drive interface 33, and an optical drive interface 34, respectively. The drives and their associated computer-readable media may provide nonvolatile storage of computer-readable instructions, data structures, program modules and other data for the computing system 100.

Although the computing system 100 is described herein as having a hard disk, a removable magnetic disk 29 and a removable optical disk 31, it should be appreciated by those skilled in the art that the computing system 100 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

A number of program modules may be stored on the hard disk 27, magnetic disk 29, optical disk 31, ROM 24 or RAM 25, including an operating system 35, one or more application programs 36, program data 38, and a database system 200. The database system 200 may be configured to manage storing and retrieving binary objects, and will be described in more detail with reference to FIGS. 2-4 in the paragraphs below. The operating system 35 may be any suitable operating system that may control the operation of a networked personal or server computer, such as Windows® XP, Mac OS® X, Unix-variants (e.g., Linux® and BSD®), and the like.

A user may enter commands and information into the computing system 100 through input devices, such as a keyboard 40 and pointing device 42. Other input devices may include a microphone, joystick, game pad, satellite dish, scanner, or the like. These and other input devices may be connected to the CPU 21 through a serial port interface 46 coupled to system bus 23, but may be connected by other interfaces, such as a parallel port, game port or a universal serial bus (USB). A monitor 47 or other type of display device may also be connected to system bus 23 via an interface, such as a video adapter 48. In addition to the monitor 47, the computing system 100 may further include other peripheral output devices such as speakers and printers.

Further, the computing system 100 may operate in a networked environment using logical connections to one or more remote computers 49. The logical connections may be any connection that is commonplace in offices, enterprise-wide computer networks, intranets, and the Internet, such as local area network (LAN) 51 and a wide area network (WAN) 52. When using a LAN networking environment, the computing system 100 may be connected to the local network 51 through a network interface or adapter 53. When used in a WAN networking environment, the computing system 100 may include a modem 54, wireless router or other means for establishing communication over a wide area network 52, such as the Internet. The modem 54, which may be internal or external, may be connected to the system bus 23 via the serial port interface 46. In a networked environment, program modules depicted relative to the computing system 100, or portions thereof, may be stored in a remote memory storage device 50. It will be appreciated that the network connections shown are exemplary and other means of establishing a communications link between the computers may be used.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 2:
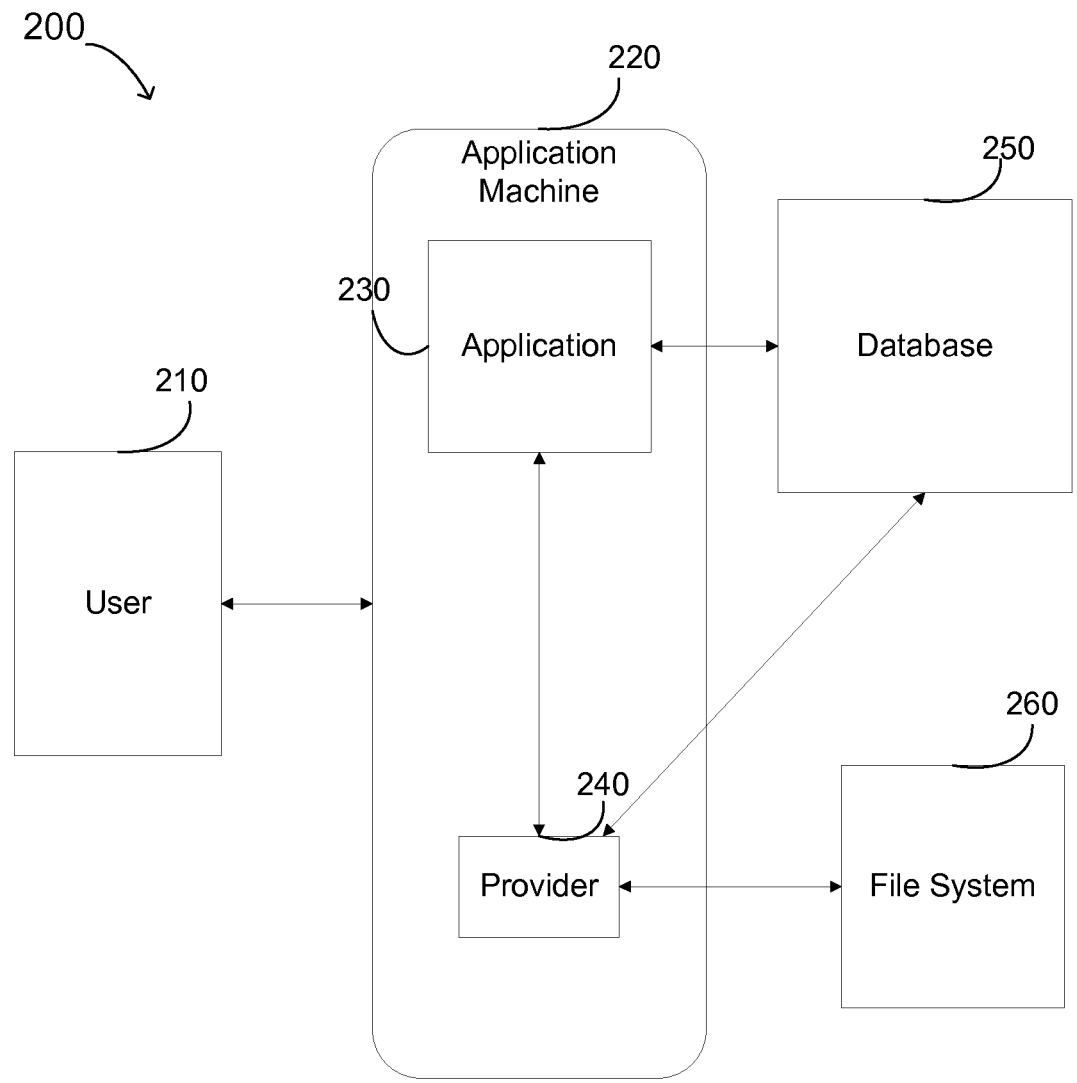
FIG. 2 illustrates a schematic diagram of a database system in which the various techniques described herein may be incorporated and practiced.

FIG. 2 illustrates a schematic diagram of a database system 200 in which the various technologies described herein may be incorporated and practiced. The database system 200 may include a user 210 and an application machine 220 that interfaces with the user 210, e.g., locally or remotely. The application machine 220 may include an application 230 in communication with a provider 240. In other implementations, an additional layer called a remote blob storage client library may be present to facilitate communication between the application 230 and the provider 240. Both the application 230 and the provider 240 may be in communication with a database 250, and the provider 240 may be in communication with a file system 260.

Typically, the user 210 may interface with the application 230. For example, the user 210 may enter information into a form on a web page hosted by the application machine 220. After the user 210 enters the information, the application 230 may generate a request to the provider 240 to store such information as a binary object. Conversely, the user 210 may request to view information already stored in a binary object, which may result in the application 230 requesting the provider 240 to retrieve the binary object. To this end, binary objects may be stored in the database 250 itself or in the file system 260. In some instances, binary objects may be referred to as binary large objects or blobs.

In light of the interactions describe above, while the application 230 may interface with the user 210 and the database 250 at a high level, the provider 240 may perform the actual backend communications with the database 250 and/or the file system 260 in regards to storing or retrieving binary objects. Thus, the application 230 may be prevented from having to know how the database 250 and file system 260 are implemented. Indeed, the application 230 may instead rely on the provider 240 to provide such functionality. Such flexibility may enable the application 230 to continue functioning properly even while backend devices in the database 250 or file system 260 may be changed. In one implementation, the provider 240 may be implemented for Remote Blob Storage (RBS). RBS may refer to an application programming interface (API) that enables applications to store binary objects without being tied to any particular backend storage solution.

In another implementation, the file system 260 may be located remotely from the database 250 and/or the application machine 220 and may be referred to as a remote blob store. As previously mentioned, storing binary objects in the file system 260 may be relatively efficient for relatively larger sized binary objects compared to relatively smaller sized binary objects. Furthermore, the file system 260 may be implemented using any type of storage solution including, but not limited to, hard disk drives, magnetic tape drives, solid state storage, and optical disk mediums.

Figure 3:
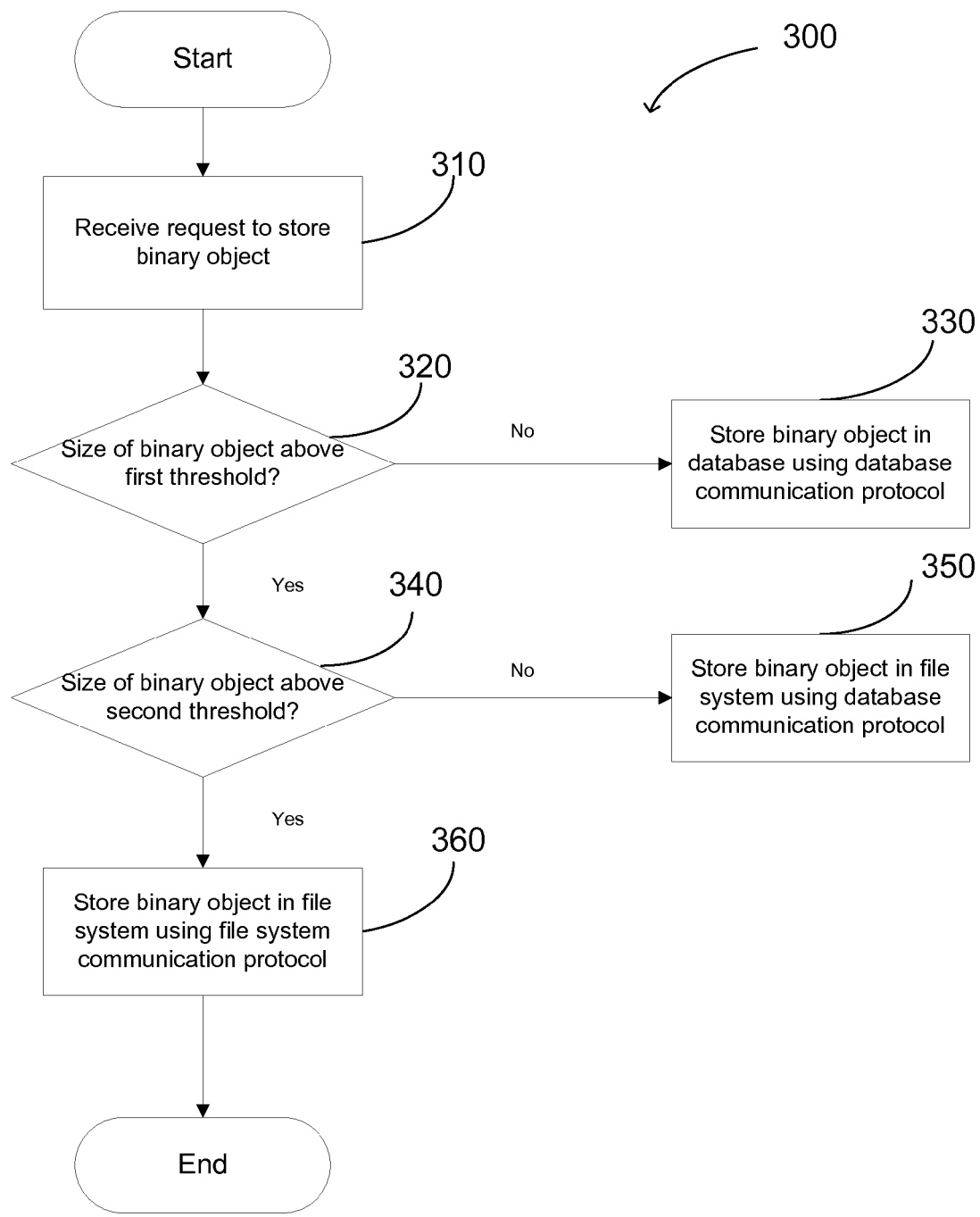
FIG. 3 illustrates a flow diagram of a method for managing a binary object in a database system in accordance with one or more implementations of various techniques described herein.

FIG. 3 illustrates a flow diagram of a method 300 for storing binary objects in a database system in accordance with one or more implementations of various techniques described herein. The following description of method 300 is made with reference to computing system 100 of FIG. 1 and database system 200 of FIG. 2. In one implementation, method 300 may be performed by the provider 240. It should be understood that while the method 300 indicates a particular order of execution of the operations, in some implementations, certain portions of the operations might be executed in a different order.

At step 310, the provider 240 may receive a request to store a binary object. Such a request may occur due to various circumstances as described above. For instance, the user 210 may interact with the application 230 by entering information into a webpage hosted by the application machine 220. After the user 210 enters the information, a request may be sent to the application 230 to store the information in a binary object. The application 230 may then request the provider 240 to perform the actual task of storing the binary object. It should be noted that there exist many paths that may result in the provider 240 receiving the request to store a binary object, and that the manner in which the provider 240 receives the request is not limited to the example provided above.

At step 320, the provider 240 may determine if the size of the binary object is above a first threshold. At step 330, if the size of the binary object is not above the first threshold, the provider 240 may store the binary object in the database 250 using a database transfer protocol. In one implementation, the first threshold may be approximately 60 Kilobytes. Under these circumstances, the binary object may be considered relatively small in size. In another implementation, the database communication protocol may be Tabular Data Stream (TDS), though various other communication protocols may also be used. Additionally, when the binary object is stored in the database, the binary object may be stored as an SQL varbinary data type.

At step 340, if the binary object size is above the first threshold, the provider 240 may determine if the binary object size is above a second threshold. As such, the second threshold may be larger than the first threshold. In one implementation, the second threshold may be approximately 1.2 Megabytes. Under these circumstances, the binary object may be considered relatively medium in size. At step 350, if the binary object size is less than the second threshold, the provider 240 may store the binary object in the file system 260 using the database communication protocol (e.g., TDS). When the binary object is stored in the file system 260, the binary object may be stored as an SQL Filestream data type.

At step 360, if the binary object size is indeed above the second threshold, the provider 240 may store the binary object in the file system 260 using a file system communication protocol. Under these circumstances, the binary object may be considered relatively large in size. In one implementation, the file system communication protocol may be Microsoft Server Message Block protocol (SMB protocol), though various other file system communication protocols may also be used.

Figure 4:
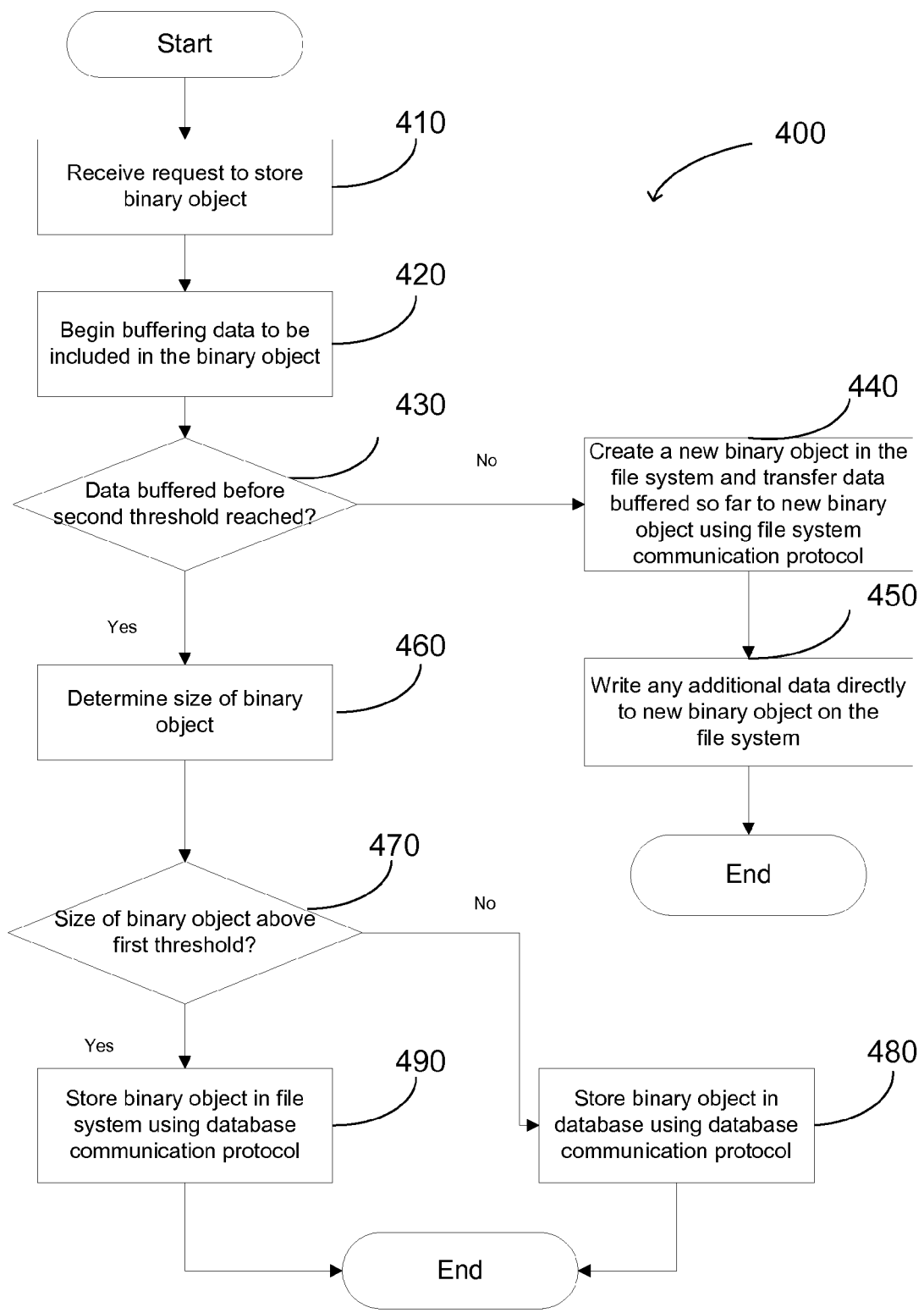
FIG. 4 illustrates a flow diagram of a method for determining a binary object size in a database system in accordance with one or more implementations of various techniques described herein.

FIG. 4 illustrates a flow diagram of a method 400 for determining a binary object size in the database system 200 in accordance with one or more implementations of various techniques described herein. The following description of method 400 is made with reference to computing system 100 of FIG. 1, the database system 200 of FIG. 2, and method 300. In one implementation, method 400 may be performed by the provider 240. It should be understood that while the method 400 indicates a particular order of execution of the operations, in some implementations, certain portions of the operations might be executed in a different order. Furthermore, method 400 may operate under the assumption that the size of the binary object is not already known.

At step 410, the provider 240 may receive a request to store a binary object. As previously mentioned, such a request may occur as a result of the user 210 interacting with the application 230, which may then generate the request to the provider 240. At step 420, because the size of the binary object may be unknown, the provider 240 may begin buffering the data that is to be included in the binary object to determine the size of the binary object. In one implementation, the provider 240 may buffer the binary object data in a memory located on the application machine 220.

At step 430, the provider 240 may determine if the size of the data associated with the binary object has reached the second threshold (i.e., the second threshold of FIG. 3). If the size of the data has reached the second threshold, then the binary object may be considered relatively large in size. Therefore, at step 440, the provider 240 may create a new binary object in the file system 260, e.g., a binary object of the Filestream data type. Furthermore, the provider 240 may then transfer the data that has been buffered into the newly created binary object using the file system communication protocol, e.g., SMB protocol. Additionally, at step 450, any further data that is to be stored as part of the binary object may then be written directly to the newly created binary object on the file system 260.

At step 460, if the data has been completely buffered before its size has reached the second threshold, then the provider 240 may determine the size of the binary object in the buffer. In one implementation, the provider 240 may keep a counter to track the size of the data as it is being buffered. Then, at step 470, the provider 240 may determine whether the size of the binary object is above the first threshold (i.e., the first threshold described in FIG. 3).

If the size of the binary object is not above the first threshold, the provider 240 may store the binary object in the database 250 using the database communication protocol at step 480. For example, the provider may store the binary object as an SQL Varbinary data type using the TDS protocol. At step 490, if the binary object size is indeed above the first threshold, the provider 240 may store the binary object in the file system 260 using the database communication protocol. For example, the provider 240 may store the binary object as an SQL Filestream data type using the TDS protocol.

Managing binary objects in the database system 200 according to various technologies described above may have an advantage of storing binary objects in an efficient manner according to the size of the binary objects. For example, storing a binary object in the database 250 may be relatively efficient for binary objects relatively small in size, but may grow increasingly inefficient with larger binary objects. Indeed, storing blobs in the database 250 may involve writing a separate copy to a database log. This overhead may therefore grow with binary object size.

Conversely, storing binary objects in the file system 260 may prove relatively efficient for binary objects of relatively medium and large size but may be inefficient for relatively small binary objects. For example, storing a binary object as a Filestream data type may involve a constant overhead independent of the binary object size. However, this overhead may be prohibitive in regards to storing relatively small binary objects. Therefore, various technologies described herein may store binary objects of relatively medium and large sizes in the file system 260. As a result, various technologies described herein may enable relatively small binary objects to be efficiently stored in the database 250 and relatively larger binary objects to be efficiently store in the file system 260.

In addition, buffering a binary object in memory when the size of the binary object is not known beforehand prevents certain overheads in storing relatively large binary objects. For example, in typical implementations, the entire binary object may first be cached on the application machine 220. In order to determine the size of the binary object, the database 250 may then be queried. Under this framework, typical implementations would first need to store the binary object, query the database 250 for its size, then choose the correct method of storage depending on the size. By buffering the binary object, the provider 240 may avoid writing the entire binary object before determining where to store it.

Furthermore, various technologies described herein may provide for certain optimizations in managing a binary object in the database system 200. For example, the size of a binary object may be associated with an identifier representing the binary object. In one implementation, the size of a binary object may be encoded into a global unique identifier (GUID) associated with the binary object. A GUID may provide a unique reference number for each binary object and may be typically represented by 32 character hexadecimal string. However, because various other information may also be encoded into the GUID, the GUID may not be able to provide enough storage to encode the entire size of the binary object. Thus, instead of encoding the exact size of the binary object, which in some cases may take up to eight bytes, the size may instead be compressed and then encoded. In one implementation, the size may be compressed by taking the logarithm of the size of the binary object. As such, the encoding of the binary object size may be reduced to approximately four bytes.

In another implementation, buffering binary object data or any other data may be optimized for use in the .NET CLR framework. To this end, in .NET CLR, allocating or freeing space for data greater than 85,000 bytes may result in relatively severe performance issues. For example, severe fragmentation of memory in the application machine 220 may occur thereby decreasing overall performance of the database system 200. Therefore, when transferring a binary object larger than 85,000 bytes, the binary object may be divided into various buffers smaller than 85,000 bytes. These smaller buffers may be combined or stringed together to form the entire binary object. In one implementation, when reading a binary object of a known size, an array of array of buffers may be formed to compose the binary object. In another implementation, when writing a binary object, buffers may be added while writing until the entire binary object is written. These buffers may be stored in a single list. Thus, the binary object may be transferred, communicated, or otherwise managed while avoiding the performance issues related to .NET CLR.

Another implementation may relate to determining the file path of a binary object stored in the file system 260 when the binary object is queried or otherwise requested. In typical database systems, each time a binary object is requested, a query may be made to the database 250 to discover its file path. Under the various technologies described herein, the file paths associated with binary objects stored in the file system 260 may contain a constant portion for all such binary objects and a variable portion that differs for each binary object. The constant portion may typically contain information, such as the machine name, share name, database, table, and the like associated with the binary object. The variable portion may simply be the GUID of the binary object.

To this end, when retrieving a binary object from the file system 260, the provider 240 may itself construct the file path associated with the binary object. Thus, the provider 240 may avoid querying the database 250 for a binary object's file path each time the binary object is requested. The provider 240 may discover the constant portion of the file path for every binary object by making a single query to the database 250 when the provider 240 is first initialized. The variable portion of a binary object's file path may be inferred from by the provider 240 from the application 230 requesting the binary object. Therefore, after discovering the constant portion and variable portion, the provider 240 may simply combine both portions to construct the file path for the binary object.

In yet another implementation, an optimization may be performed when handling a binary object using the file system communication protocol. Typically, every time a binary object is read using the file system communication protocol, the database 250 may be queried for a parameter sometimes referred to as a transaction context. Under the various technologies provided herein, the provider 240 may instead keep track of a pool of read-only transactions. For these transactions, the provider 240 may then cache their transaction contexts, which may be applied when a binary object is read. Thus, redundant queries to the database 250 for transaction contexts may be avoided.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for managing a binary object in a database system, the method comprising:
   determining if a size of data that is associated with the binary object has reached a first threshold; and
   if the size of the data has reached the first threshold, creating a new binary object in a file system of the database system and writing the data to the new binary object using a file system communication protocol.

2. The method of claim 1, further comprising writing additional data associated with the binary object to the new binary object in the file system.

3. The method of claim 1, further comprising:
   if the size of the data has not reached the first threshold, determining if the size of the data is above a second threshold, wherein the second threshold is less than the first threshold;
   if the size of the data is less than the second threshold, storing the binary object in a database of the database system using a database communication protocol; and
   if the size of the data is above the second threshold, storing the binary object in the file system using the database communication protocol.

4. The method of claim 3, wherein storing the binary object in the database comprises storing the binary object as a Structured Query Language Varbinary data type.

5. The method of claim 3, wherein the database communication protocol is Tabular Data Stream (TDS).

6. The method of claim 3, wherein storing the binary object in the file system comprises storing the binary object as a Structured Query Language Server Filestream data type.

7. The method of claim 1, wherein the file system communication protocol is a Server Message Block (SMB) protocol.

8. The method of claim 1, further comprising if the size of the binary object is greater than a third threshold, dividing the binary object into a plurality of buffers each less than the third threshold.

9. The method of claim 1, further comprising encoding the size of the binary object into an identifier associated with the binary object.

10. The method of claim, 9 further comprising:
    in response to a request to retrieve the binary object from the file system, constructing a file path associated with the binary object by combining a constant portion of the file path and a variable portion of the file path, wherein the constant portion of the file path is constant for a plurality of binary objects stored in the file system, and wherein the variable portion comprises the identifier.

11. A system for managing a binary object in a database system, the system comprising:
    one or more processors;
    a first program module configured to determine whether a size of data that is associated with the binary object reaches a first threshold; and
    a second program module, implemented using at least one of the one or more processors, configured to create a new binary object in a file system of the database system and to write the data to the new binary object using a file system communication protocol in response to the size of the data reaching the first threshold.

12. The system of claim 11, wherein the first program module is further configured to determine whether the size of the data reaches a second threshold in response to the size of the data not reaching the first threshold, wherein the second threshold is less than the first threshold;
    wherein the second program module is further configured to store the binary object in a database of the database system using a database communication protocol in response to the size of the data being less than the second threshold; and
    wherein the second program module is further configured to store the binary object in the file system using the database communication protocol in response to the size of the data being greater than the second threshold.

13. The system of claim 12, wherein the second program module is configured to store the binary object as a Structured Query Language Varbinary data type in the database in response to the size of the data being less than the second threshold.

14. The system of claim 12, wherein the second program module is configured to store the binary object as a Structured Query Language Server Filestream data type in the file system in response to the size of the data being greater than the second threshold.

15. The system of claim 11, further comprising:
    a third program module configured to divide the binary object into a plurality of buffers, each buffer in the plurality of buffers having a size that is less than a third threshold, in response to the size of the binary object being greater than the third threshold.

16. The system of claim 11, further comprising:
a third program module configured to encode the size of the binary object into an identifier associated with the binary object.

17. The system of claim, 16 further comprising:
a fourth program module configured to, in response to a request to retrieve the binary object from the file system, construct a file path associated with the binary object by combining a constant portion of the file path and a variable portion of the file path;
wherein the constant portion of the file path is constant for a plurality of binary objects stored in the file system; and
wherein the variable portion of the file path includes the identifier.

18. A computer storage medium having instructions recorded thereon for enabling a processor-based system to manage a binary object in a database system, the instructions comprising:
first instructions for enabling the processor-based system to determine whether a size of data that is associated with the binary object has reached a first threshold; and
second instructions for enabling the processor-based system to, if the size of the data has reached the first threshold, create a new binary object in a file system of the database system and write the data to the new binary object using a file system communication protocol.

19. The computer storage medium of claim 18, wherein the second instructions comprise:
instructions for enabling the processor-based system to write additional data associated with the binary object to the new binary object in the file system.

20. The computer storage medium of claim 18, wherein the first instructions comprise:
instructions for enabling the processor-based system to, if the size of the data has not reached the first threshold, determine whether the size of the data is greater than a second threshold, wherein the second threshold is less than the first threshold;
instructions for enabling the processor-based system to, if the size of the data is less than the second threshold, store the binary object in a database of the database system using a database communication protocol; and
instructions for enabling the processor-based system to, if the size of the data is greater than the second threshold, store the binary object in the file system using the database communication protocol.

21. A method of managing a binary object in a database system, the method comprising:
determining whether a size of data that is associated with the binary object is greater than or equal to a first threshold;
if the size of the data is greater than or equal to the firs threshold, creating a new file in a file system of the database system to store the binary object; and
receiving the data associated with the binary object using a file system communication protocol.

22. The method of claim 21, wherein creating the new file in the file system comprises:
creating the new file in the file system of the database system to store the binary object as a Structured Query Language data type.

23. The method of claim 21, further comprising:
storing at least a portion of a file path to the new file in a database of the database system.

24. The method of claim 21, wherein receiving the date associated with the binary object comprises:
receiving the data associated with the binary object as a stream.

25. The method of claim 21, wherein receiving the data associated with the binary object comprises:
applying a transaction context to receive the data associated with the binary object.

26. A system to manage a binary object in a database system, the system comprising:
one or more processors;
a first program module configured to determine whether a size of data that is associated with the binary object is greater than or equal to a first threshold;
a second program module, implemented using at least one of the one or more processors, configured to create a new file in a file system of the database system to store the binary object in response to a determination that the size of the data is greater than or equal to the first threshold; and
a third program module configured to receive the data associated with the binary object using a file system communication protocol.

27. The system of claim 26, wherein the second program module is configured to store the binary object as a Structured Query Language data type in the new file.

28. The system of claim 26, further comprising:
a fourth program module configured to store at least a portion of a file path to the new file in a database of the database system.

29. The system of claim 26, wherein the third program module is configured to receive the data associated with the binary object as a stream.

30. The system of claim 26, wherein the third program module is configured to apply a transaction context to receive the data associated with the binary object.

\* \* \* \* \*